United States Patent
Shroff et al.

(10) Patent No.: US 12,277,394 B2
(45) Date of Patent: Apr. 15, 2025

(54) SYSTEMS AND METHODS FOR MULTI-UTTERANCE GENERATION OF DATA WITH IMMUTABILITY REGULATION AND PUNCTUATION-MEMORY

(71) Applicant: Tata Consultancy Services Limited, Mumbai (IN)

(72) Inventors: Nidhi Harshad Shroff, Mumbai (IN); Paras Dwivedi, Mumbai (IN); Siva Prasad Pusarla, Mumbai (IN); Sudhakara Deva Poojary, Mumbai (IN); Pranav Champaklal Shah, Mumbai (IN); Varsha Nayak, Mumbai (IN); Amit Aggrawal, Mumbai (IN); Godfrey Claudin Mathais, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 284 days.

(21) Appl. No.: 17/978,443

(22) Filed: Nov. 1, 2022

(65) Prior Publication Data
US 2023/0281393 A1    Sep. 7, 2023

(30) Foreign Application Priority Data
Mar. 1, 2022    (IN) .............................. 202221011116

(51) Int. Cl.
*G06F 40/30* (2020.01)
*G06F 40/211* (2020.01)
(Continued)

(52) U.S. Cl.
CPC ............ *G06F 40/30* (2020.01); *G06F 40/211* (2020.01); *G06F 40/284* (2020.01); *G06F 40/289* (2020.01)

(58) Field of Classification Search
CPC .................................. G06F 16/33; G06F 40/30
See application file for complete search history.

(56) References Cited

U.S. PATENT DOCUMENTS 8,521,761 B2 *   8/2013   Katragadda ........... G06F 16/951
                                                                707/760
9,767,094 B1 *   9/2017   Beller ..................... G06F 40/30
(Continued)

OTHER PUBLICATIONS

Jones, Rosie, et al. "Generating query substitutions." Proceedings of the 15th international conference on World Wide Web. 2006. (Year: 2006).*

(Continued)

*Primary Examiner* — Jialong He
(74) *Attorney, Agent, or Firm* — FINNEGAN, HENDERSON, FARABOW, GARRETT & DUNNER LLP (57) ABSTRACT

This disclosure relates to systems and methods for multi-utterance generation of data. Embodiments of the present disclosure utilizes a smart framework that is capable of generating contextually relevant utterances with immutability regulation and punctuation-memory. More Specifically, the present disclosure generates multiple syntactically and semantically correct utterances for text input data in such a way that a provision to selectively maintain or regulate phrases or words intact is provided and punctuation consistency is maintained.

11 Claims, 4 Drawing Sheets

(51) Int. Cl.
*G06F 40/284* (2020.01)
*G06F 40/289* (2020.01)

(56) References Cited

U.S. PATENT DOCUMENTS

| | | |
|---|---|---|
| 10,824,818 B2 | 11/2020 | Peper et al. |
| 10,868,778 B1 | 12/2020 | Taylor et al. |
| 10,916,237 B2 | 2/2021 | Yan et al. |
| 10,929,601 B1 | 2/2021 | Trafny et al. |
| 10,997,968 B2 | 5/2021 | Wanas et al. |
| 2007/0288448 A1* | 12/2007 | Datta ............... G06F 16/3338 707/999.005 |
| 2010/0082657 A1* | 4/2010 | Paparizos ............ G06F 16/374 707/E17.015 |
| 2012/0109978 A1* | 5/2012 | Datta ............... G06F 16/3338 707/750 |
| 2018/0011838 A1* | 1/2018 | Beller ............... G06F 16/3329 |

OTHER PUBLICATIONS

Lu, Meili, et al. "Query expansion via wordnet for effective code search." 2015 IEEE 22nd International Conference on Software Analysis, Evolution, and Reengineering (SANER). IEEE, 2015. (Year: 2015).*

Keskisärkkä, Robin. "Automatic text simplification via synonym replacement." (2012). (Year: 2012).*

* cited by examiner

| PRx | has | a | necklace | - | like | structure | ; | a | linear | molecule | pervades | the |
|---|---|---|---|---|---|---|---|---|---|---|---|---|
| | | | | | | | | | | | imbues | |
| | | | | | | | | | | | penetrates | |
| | | | | | | | | | | | diffuses | |
| | | | | | | | | | | | permeates | |

| cavity | of | a | cyclic | molecule | and | both | ends | capped |
|---|---|---|---|---|---|---|---|---|
| | | | | | | | terminals | |

| with | a | bulky | substituent | . |
|---|---|---|---|---|

FIG. 4

SYSTEMS AND METHODS FOR MULTI-UTTERANCE GENERATION OF DATA WITH IMMUTABILITY REGULATION AND PUNCTUATION-MEMORY

PRIORITY CLAIM

This U.S. patent application claims priority under 35 U.S.C. § 119 to: India Application No. 202221011116, filed on Mar. 1, 2022. The entire contents of the aforementioned application are incorporated herein by reference.

TECHNICAL FIELD

The disclosure herein generally relates to the field of natural language processing, and, more particularly, to systems and methods for multi-utterance generation of data with immutability regulation and punctuation-memory.

BACKGROUND

Natural language processing is an emerging area applied in a vast number of applications. Few applications in the field of Natural Language Processing such as chatbot training and diverse question paper generation require multiple utterances of the given data. For instance, in frequently asked question (FAQ) chatbot creation, it is required that the chatbot be trained with multiple ways in which queries could be asked to invoke individual answers. Conventionally, the process of utterance generation involves manual efforts and for the utterances to be contextually relevant, identification of subject area also is required. There exist several conventional approaches for utterance generation that work with a blackbox approach taking in data and giving augmented utterances. However, these approaches fail to provide any control over quality of utterances generated.

SUMMARY

Embodiments of the present disclosure present technological improvements as solutions to one or more of the above-mentioned technical problems recognized by the inventors in conventional systems. For example, in one embodiment, a processor implemented method is provided. The method comprising: receiving, via one or more hardware processors, a plurality of input data pertaining to one or more applications, wherein the input data comprises a text input data and a non-text input data, and wherein the non-text input data comprising one or more audios, one or more images, and one or more videos; converting, via the one or more hardware processors, the plurality of non-text input data into the plurality of text input data based on one or more conversion techniques; processing, via the one or more hardware processors, the plurality of text input data to obtain a plurality of processed text input data with immutability regulation and punctuation memory enabled, wherein the plurality of text input data includes the plurality of text input data comprised in the plurality of received input data and the plurality of text input data obtained from conversion, and wherein the processing of the plurality of text input data comprising: identifying a set of words from the plurality of text input data; tokenizing each of the plurality of text input data such that the identified set of words are immutability regulated and punctuation consistency is maintained; determining a plurality of context related synonyms in an inflected form for each of a plurality of tokenized text input data; and eliminating, one or more words identified as duplicates from the plurality of tokenized text input data added with the plurality of context related synonyms in the inflected form; iteratively generating, via the one or more processors, a plurality of multiple context-related utterances corresponding to each of the plurality of processed text input data; accumulating, via the one or more processors, the plurality of multiple context-related utterances that are ranked based on an index of deviation; and selecting, via the one or more processors, a set of high ranked multiple context-related utterances from the plurality of multiple context-related utterances when a number of possible multiple context-related utterance is greater than the number of required multiple context-related utterances.

In another aspect, a system is provided. The system comprising a memory storing instructions; one or more communication interfaces; and one or more hardware processors coupled to the memory via the one or more communication interfaces, wherein the one or more hardware processors are configured by the instructions to: receive, via one or more hardware processors, a plurality of input data pertaining to one or more applications, wherein the input data comprises a text input data and a non-text input data, and wherein the non-text input data comprising one or more audios, one or more images, and one or more videos; convert, via the one or more hardware processors, the plurality of non-text input data into the plurality of text input data based on one or more conversion techniques; process, via the one or more hardware processors, the plurality of text input data to obtain a plurality of processed text input data with immutability regulation and punctuation memory enabled, wherein the plurality of text input data includes the plurality of text input data comprised in the plurality of received input data and the plurality of text input data obtained from conversion, and wherein the processing of the plurality of text input data comprising: identifying a set of words from the plurality of text input data; tokenizing each of the plurality of text input data such that the identified set of words are immutability regulated and punctuation consistency is maintained; determining a plurality of context related synonyms in an inflected form for each of a plurality of tokenized text input data; and eliminating, one or more words identified as duplicates from the plurality of tokenized text input data added with the plurality of context related synonyms in the inflected form; iteratively generate, via the one or more processors, a plurality of multiple context-related utterances corresponding to each of the plurality of processed text input data; accumulate, via the one or more processors, the plurality of multiple context-related utterances that are ranked based on an index of deviation; and select, via the one or more processors, a set of high ranked multiple context-related utterances from the plurality of multiple context-related utterances when a number of possible multiple context-related utterance is greater than the number of required multiple context-related utterances.

In yet another aspect, a non-transitory computer readable medium is provided. The non-transitory computer readable medium, comprising: receiving, via one or more hardware processors, a plurality of input data pertaining to one or more applications, wherein the input data comprises a text input data and a non-text input data, and wherein the non-text input data comprising one or more audios, one or more images, and one or more videos; converting, via the one or more hardware processors, the plurality of non-text input data into the plurality of text input data based on one or more conversion techniques; processing, via the one or more hardware processors, the plurality of text input data to obtain a plurality of processed text input data with immutability regulation and punctuation memory enabled, wherein the plurality of text input data includes the plurality of text input data comprised in the plurality of received input data and the plurality of text input data obtained from conversion, and wherein the processing of the plurality of text input data comprising: identifying a set of words from the plurality of text input data; tokenizing each of the plurality of text input data such that the identified set of words are immutability regulated and punctuation consistency is maintained; determining a plurality of context related synonyms in an inflected form for each of a plurality of tokenized text input data; and eliminating, one or more words identified as duplicates from the plurality of tokenized text input data added with the plurality of context related synonyms in the inflected form; iteratively generating, via the one or more processors, a plurality of multiple context-related utterances corresponding to each of the plurality of processed text input data; accumulating, via the one or more processors, the plurality of multiple context-related utterances that are ranked based on an index of deviation; and selecting, via the one or more processors, a set of high ranked multiple context-related utterances from the plurality of multiple context-related utterances when a number of possible multiple context-related utterance is greater than the number of required multiple context-related utterances.

In accordance with an embodiment of the present disclosure, a subject domain corresponding to the plurality of input data is identified when required for the one or more applications based on at least one of (i) a user input, and (ii) using a statistical domain association based technique.

In accordance with an embodiment of the present disclosure, the identified set of words comprising a domain specific text determined from a first dictionary stored in a system database, an adaptable list of user specified text, and a set of marked strings of words, wherein the identified set of words is maintained across a plurality of instances of the multiple context-related utterances constructed.

In accordance with an embodiment of the present disclosure, the step of tokenizing each of the plurality of input data is preceded by performing an expansion of one or more contractions based text present in the plurality of text input data.

In accordance with an embodiment of the present disclosure, the punctuation memory is enabled by creating a second dictionary comprising an information relevant to usage of a plurality of punctuations that are required when generating the multiple context-related utterances and the information relevant to usage of the plurality of punctuations includes preceding and succeeding token information.

In accordance with an embodiment of the present disclosure, the first dictionary is dynamically updated when a coupling coefficient of n-grams of the plurality of text input data exceeds a predefined threshold.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Natural language processing is an emerging area applied in a vast number of applications. Few applications in the field of Natural Language Processing such as chatbot training and diverse question paper generation require multiple utterances of the given data. For instance, in frequently asked question (FAQ) chatbot creation, it is required that the bot be trained with multiple ways in which queries could be asked to invoke individual answers. Considering a simple chatbot having 5 FAQs, and for each answer, if 5 queries are formulated, that would mean generation of 5 answers*5 queries=25 queries. Conventionally, the process of utterance generation involves manual efforts and for the utterances to be contextually relevant, identification of subject area is also required. There exist several conventional approaches for utterance generation that work with a black box approach taking in data and giving augmented utterances. However, these approaches fail to provide any control over quality of utterances generated.

The present disclosure addresses unresolved problems of multi-utterance generation with a control over quality of utterances generated. Embodiments of the present disclosure provide systems and methods for multi-utterance generation of data which utilizes a smart framework that is capable of generating contextually relevant (i.e., syntactically and semantically correct) utterances with immutability regulation and punctuation-memory. In the context of the present disclosure, the expression 'immutability regulation' is interchangeable with an expression 'selective immutability'. In the context of the present disclosure, the expression 'selective immutability' refers to a provision to selectively maintain or regulate phrases/words intact. In other words, the present disclosure provides a solution that discusses a way of expressing a given text in different ways considering relevance to the domain with immutability regulation. Thus, when training a model, feeding the data to the system of the present disclosure minimizes efforts for manual creation of training data. There are multiple synonyms for different words in text data and depending on usage, at times, they can only be replaced by selected few to syntactically make sense. The method of the present disclosure receives input data, and determines a domain to which it belongs, if not specified. For example, it is determined if the input data is art-related or sports-related or finance-related and so on. Further, a plurality of synonyms from the determined domain are determined to create new utterances. For example, word 'interest' could mean 'fascinate' or 'intrigue' in sports. However, in finance, it could imply 'profits' or 'returns'. Also, to further improve the quality of the output, the method of the present disclosure provides customizations. These customizations may include specifying special phrases that need to be kept as is while processing the input data, quoted-text preservation, and punctuation memory. This ensures that the quality of the utterances generated is not compromised.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
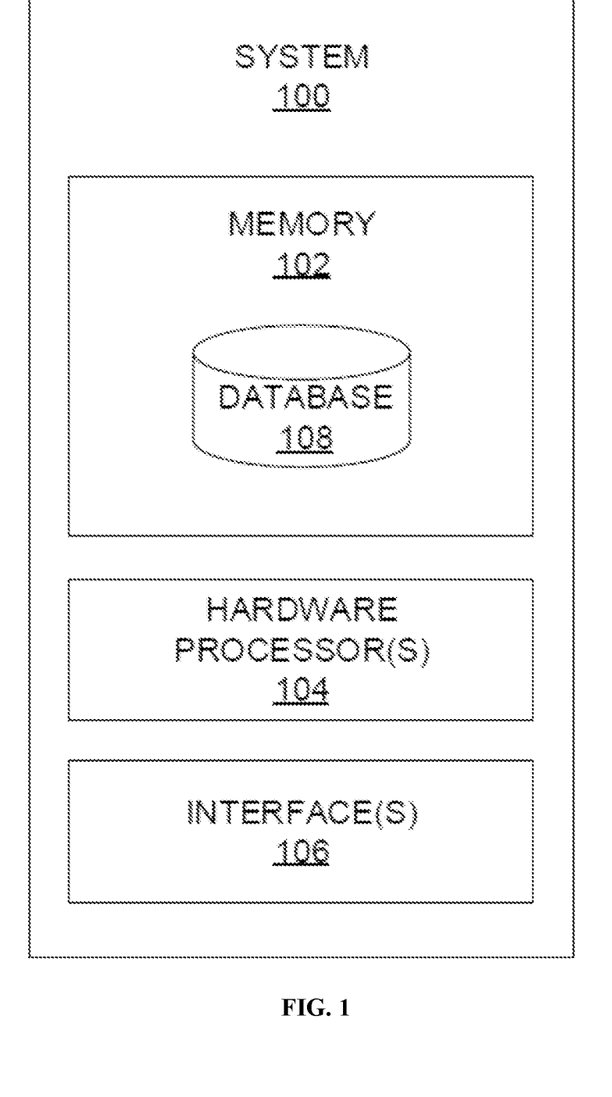
FIG. 1 illustrates an exemplary system for multi-utterance generation of data with immutability regulation and punctuation-memory according to some embodiments of the present disclosure.

FIG. 1 illustrates an exemplary system 100 for multi-utterance generation of data with immutability regulation and punctuation-memory according to some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 stores the plurality of input data/output, preprocessed data, and one or more types of dictionaries, one or more type of converters such as audio to text converters, video to text converters and/or the like.

The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
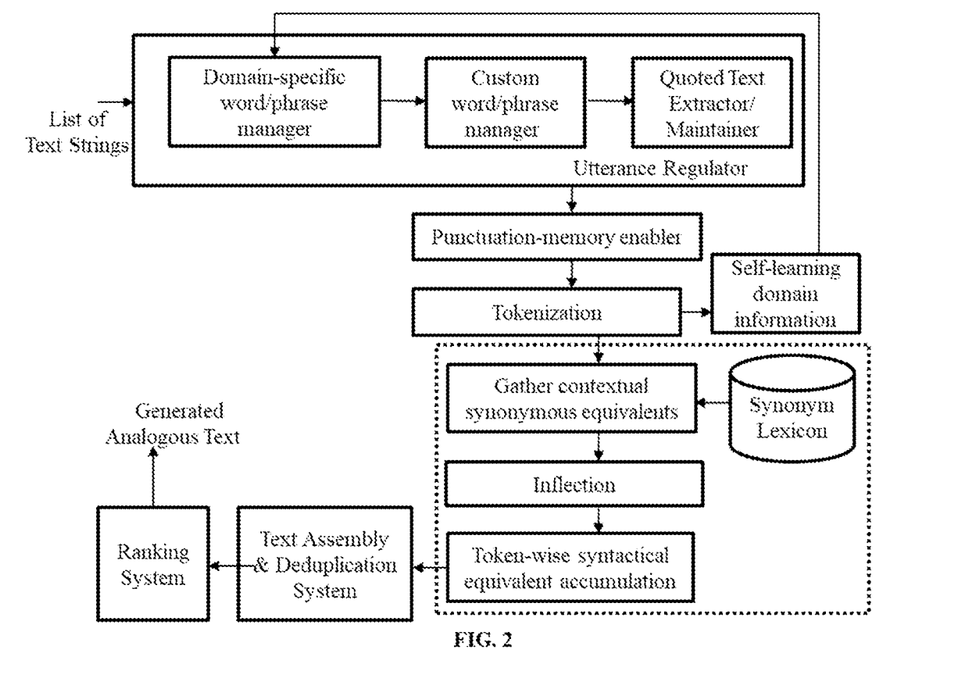
FIG. 2 depicts a functional block diagram of the system of FIG. 1, according to some embodiments of the present disclosure.

FIG. 2, with reference to FIG. 1, is a functional block diagram of the system of FIG. 1, for multi-utterance generation of data with immutability regulation and punctuation-memory, in accordance with an embodiment of the present disclosure. Functions of different components of the system 100 as depicted in FIG. 2 are explained with reference to the steps of the flow diagram depicted in FIG. 3.

Figure 3:
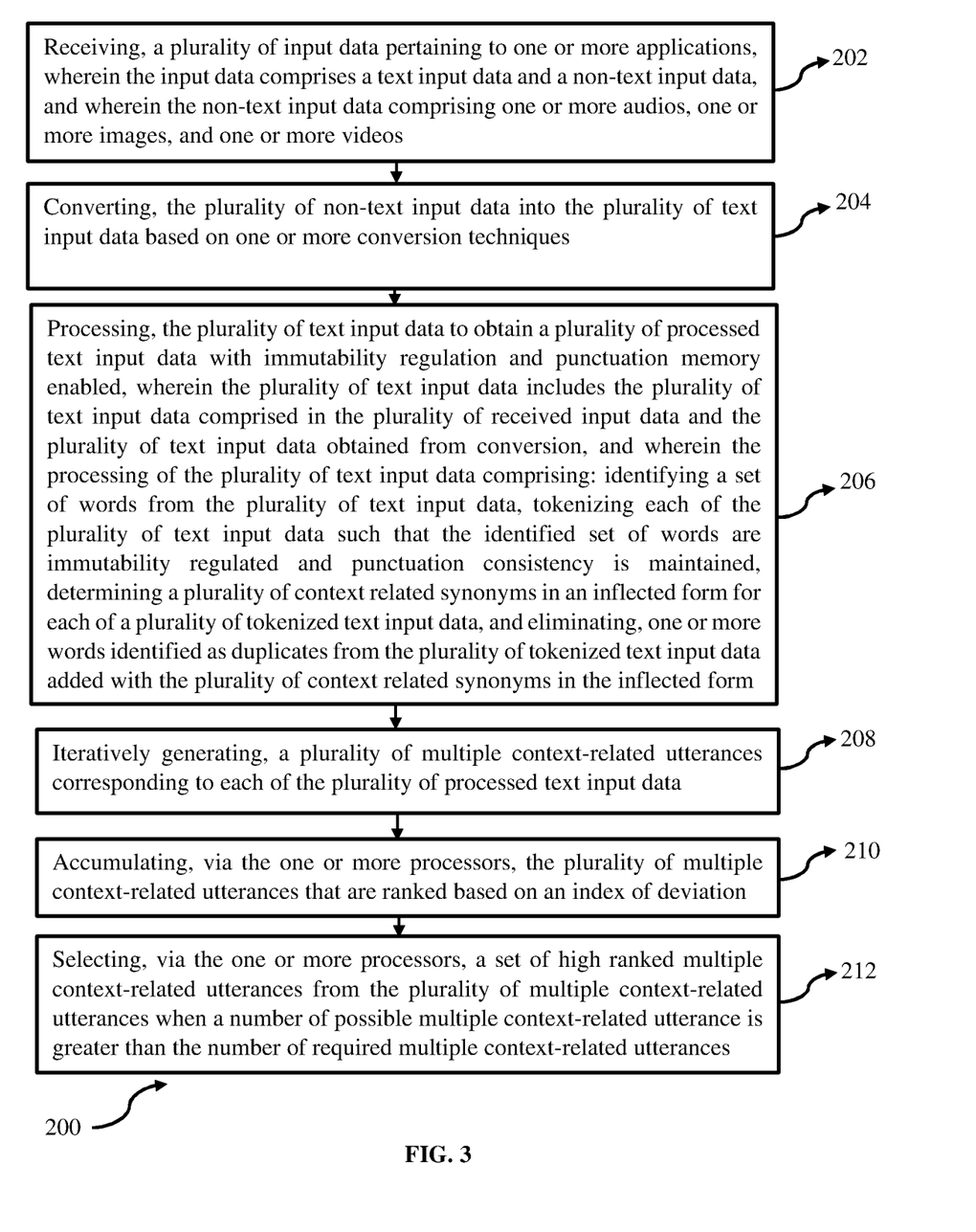
FIG. 3 depicts an exemplary flow diagram illustrating a method for multi-utterance generation of data with immutability regulation and punctuation-memory according to some embodiments of the present disclosure.

FIG. 3, with reference to FIGS. 1-2, depicts an exemplary flow chart illustrating a method 200 for multi-utterance generation of data with immutability regulation and punctuation-memory, using the system 100 of FIG. 1, in accordance with an embodiment of the present disclosure.

Referring to FIG. 3, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the block diagram of FIG. 2, the flow diagram as depicted in FIG. 3 and the working example depicted in FIG. 4. In an embodiment, at step 202 of the present disclosure, the one or more hardware processors 104 are configured to receive a plurality of input data pertaining to one or more applications. In an embodiment, the one or more applications may include but not limited to chatbot training, question paper generation, and/or the like. In an embodiment, the plurality of input data may be received from a user or an external system. In an embodiment, the plurality of input data comprises a text input data and a non-text input data. In an embodiment, the non-text input data comprising one or more audios, one or more images, and one or more videos.

In an embodiment, at step 204 of the present disclosure, the one or more hardware processors 104 are configured to convert the plurality of non-text input data into the plurality of text input data based on one or more conversion techniques. In an embodiment, the one or more conversion techniques may utilize a transcription model to convert the one or more images, the one or more audios, and one or more videos into a plurality of text input data. However, there exists several scenarios in which text input data is received directly as the plurality of input data. It would be appreciated that the plurality of text input data can be a list of strings or the whole of the text at once. As depicted in the block diagram of FIG. 2, a list of text strings is considered as input data. In an embodiment, upon receiving the list of text strings as input, one or more conditional parameters related to the list of text string are identified. These one or more conditional parameters include number of utterances required for each text comprised in the list of text string, identifying a subject domain corresponding to the plurality of input data when required for the one or more applications based on at least one of (i) a user input, and (ii) using a statistical domain association based technique. It must be appreciated that the statistical domain association based technique is known in the art. However, if the subject domain identification is not required, the step of determining the subject domain corresponding to the plurality of input data is eliminated.

In an embodiment, at step 206 of the present disclosure, the one or more hardware processors 104 are configured to process, the plurality of text input data to obtain a plurality of processed text input data with immutability regulation and punctuation memory enabled. In an embodiment, the plurality of text input data to be processed includes the plurality of text input data comprised in the plurality of received input data and the plurality of text input data obtained from conversion. In an embodiment, for the processing of the plurality of text input data, first a set of words from the plurality of text input data are identified. Further, each of the plurality of text input data is tokenized such that the identified set of words are immutability regulated and punctuation consistency is maintained. In an embodiment, the identified set of words includes a domain specific text determined from a first dictionary stored in a system database, an adaptable list of user specified text, and a set of marked strings of words. In an embodiment, the identified set of words is maintained across a plurality of instances of the multiple context-related utterances generated. The identified set of words is marked with special keywords such as in quotation marks to enable recognition by the system 100 during further processing. In another embodiment, as depicted in FIG. 2, the set of words from the plurality of text input data to maintain immutability regulation (refer to utterance regulator block that is in the first row of the block diagram) are identified in two stages:

Stage I: Identification of subject domain-specific words/phrases—An auto-updating dictionary (herein referred as the first dictionary utilizing feedback mechanism) with words/phrases specific to a subject domain identifies terminology and jargons pertaining to the subject domain. This maintains quality of utterances generated by avoiding creation of contextually irrelevant constructs.

Stage II: Identification of text-specific words/phrases—An adaptable list of words/phrases specific to the input text data, which are required to be maintained across all instances of the utterances generated, can be taken as input. In addition to these phrases, string of word(s) enclosed in quotation marks is maintained as is throughout all the utterances.

In an embodiment, the step of tokenizing each of the plurality of input data is preceded by performing an expansion of one or more contractions based text present in the plurality of text input data. For example, contractions of various complexities from simple ones like "I'm", "he's" and/or the like to complex ones like "he'd", "I'd" and so on could be present in each text. Although simple contractions are straight forward, complex ones like "I'd" which could mean "I would" or "I had" depending on the context, could prove to be quite tricky for handling. Resolving these and replacing them with their expanded form, retains the context. It would be appreciated that expanding the contraction to original form helps the system 100 understand the data. While processing the text, the contractions are replaced by their expanded forms or using the likes of contractions (a python library) to consider the grammatical context when expanding. In an embodiment, the punctuation memory is enabled by creating a second dictionary comprising an information relevant to usage of a plurality of punctuations that are required when generating the multiple context-related utterances and the information relevant to usage of the plurality of punctuations includes preceding and succeeding token information. In other words, before starting with utterance generation, following points are required to be considered i. The user has an option to specify 'Custom phrases' which when found in the text should not be replaced. The method of the present disclosure identifies the custom phrases in the text input data and marks them with identifiers, so that they remain as is when generating utterances. For instance, 'branching venation' in a specific botanical text requires that the various utterances maintain these words as is in all the occurrences, however, their individual usage as 'branching' and 'venation' may be replaced by synonymous substitutes.

ii. Sometimes a text could contain quoted sub-text by someone or phrases in quotes, which should ideally be conveyed in exact same words, irrespective of construct of rest of the text. When tokenizing the text, these phrases should not be split and considered as individuals. Hence the method of the present disclosure marks these quoted texts as is so that they remain untouched in further processing.

iii. During tokenization, all words and punctuations comprised in the input text data are split as different tokens. To ensure that the positions of the punctuations be retained as is, all information regarding the punctuations is captured with respect to their position as well as what precedes and succeeds the punctuation.

After marking and capturing the above mentioned information for a given text, the text is tokenized as shown in FIG. 2 by taking care of all the phrases and punctuations (refer tokenization block that is in row 3 of the block diagram) using a library which could be a python library such as spacy and depending on whether the subject domain(s) for the text is present in the input data. Further, a plurality of context related synonyms in an inflected form for each of a plurality of tokenized text input data are determined, and one or more words identified as duplicates are eliminated from the plurality of tokenized text input data added with the plurality of context related synonyms in the inflected form. The context related synonyms for each of the tokens are extracted using synonym lexicon (alternatively referred as wordnet) as shown in FIG. 2 and converted in a usage form same as that of the token present in the text input data using a library such as pyinflect. For example, for a token 'needed', the synonyms would be looked up for its lemmatized form 'need'-giving 'require', 'want', and/or the like. However, for resulting text to be syntactically correct, the token would have to be replaced by 'required', 'wanted'. Here, 'required' and 'wanted' are the context related synonyms of 'need' in inflected form. Similarly, for a token 'needing', the context related synonyms in infected form are 'requiring' and 'wanting'. Next, for each of the tokens, a corresponding list is created containing the token itself and its synonyms which are inflected to obtain them in form of usage that the token occurs in the original text (e.g., token: needed→[needed, required, wanted]) and so on.

In an embodiment, at step 208 of the present disclosure, the one or more hardware processors 104 are configured to iteratively generate, a plurality of context-related utterances corresponding to each of the plurality of processed text input data. In other words, once the synonyms for all the required tokens are collected in their inflected forms, utterances for the input text data are generated by picking a synonym at random for each token in order as applicable and stringing them together. For example, if $n_i$ denote the length of list corresponding to each token, then the number of possible utterances are computed as: $N_{psb} = \pi n_i$.

In an embodiment, at step 210 of the present disclosure, the one or more hardware processors 104 are configured to accumulate, the plurality of multiple context-related utterances that are ranked based on an index of deviation (refer to ranking system block that is in fifth row of the block diagram shown in FIG. 2). In an embodiment, an utterance is generated by randomized approach of selection amongst the list corresponding to each of the token while maintaining the marked sub-strings and punctuation consistency. The list of utterances for each of the text in input list is constructed with an added check to avoid duplication. In an embodiment, the method of the present disclosure is capable to generate both generic as well as the plurality of context-related utterances which are further utilized based on a user or system specified requirements.

In an embodiment, at step 212 of the present disclosure, the one or more hardware processors 104 are configured to select, a set of high ranked multiple context-related utterances from the plurality of context-related utterances when a number of possible multiple context-related utterance is greater than the number of required multiple context-related utterances. After generating an utterance, it is added to a list after checking for duplication. The utterances are generated after evaluating $N_{psb}$ and $N_{req}$ as shown below in equation (1) and (2).

$$\text{If } N_{psb} \geq N_{req}, N_{gen} = N_{req} \quad (1)$$

$$\text{Else } N_{gen} = N_{psb} \quad (2)$$

This indicates if the number of possible utterances is not greater than that required, then all the utterances are returned; otherwise, the most relevant utterances are returned on the basis of the index of deviation computed to determine how tangential the generated utterances are. In another embodiment, the method of present disclosure returns $N_{req}$ unique utterances or all the possible utterances that can be generated, whichever count is lower amongst the two. In an embodiment, the first dictionary is dynamically updated when a coupling coefficient of n-grams of the plurality of text input data exceeds a predefined threshold. The n-grams from the plurality of text input data are extracted and assigned weights depending on their frequency. As depicted in FIG. 2, relevant terms are then identified by thresholding and confirmed with the user before being appended to dynamically update the first dictionary (alternatively referred as auto-updating dictionary) for domain-specific terms (refer to or self-learning domain information block that is in the third row of the block diagram). In an embodiment, the first dictionary is dynamically updated only with text input having considerable size of data since small size input data would not be sufficient to draw any generic conclusions with enough confidence. In other words, an auto updating lexicon of domain-specific words/phrases is maintained in the present disclosure which when encountered in continuous stream are retained as is in machine generated utterances. The phrases are appended to the first dictionary when the coupling co-efficient of the n-gram exceeds 0.8. The coupling coefficient is computed as a ratio of frequency of the n-gram with aggregation of the frequencies of individual tokens of the n-gram, bi-grams present in n-gram, and so on up to (n−1) grams. For example, coupling coefficient for phrase 'social distancing' is 100 percent in health domain, whereas social has a different context elsewhere and so does distancing. Such phrases are also marked for given domain.

The steps 202 till 212 are better understood by way of the following non-limiting example provided as exemplary explanation. Suppose the text input data received is 'The ECD sample contains genomic DNA mixed with an 800-bp PCR product that contains restriction sites for all the enzymes used in the digestion protocol.' In this case, the subject domain identified for the above text is chemistry and the number of required utterances ($N_{req}$) is assumed to be 10. The above text is checked for contractions and expansion is performed when contractions are present. In this case, no contraction is present, so the above text is tokenized. Further, below two cases are considered:

Case 1: When no subject domain-specific words/phrases, no text-specific words/phrases and no string of word(s) enclosed in quotation marks are specified, then the tokenized version of above-mentioned text along with inflected synonym would be as shown below and possible utterance generated are 544.

[['The'], ['ECD'], ['sample'], ['contains', 'bears', 'holds', 'carries'], ['genomic'], ['DNA'], ['mixed', 'combined', 'commingled', 'amalgamated', 'commixed', 'blended', 'blent', 'conflated', 'immixed', 'coalesced', 'unified', 'mingled', 'fused', 'melded', 'mixt', 'merged', 'fluxed'], ['with'], ['an'], ['800-'], ['bp'], ['PCR'], ['product', 'production'], ['that'], ['contains', 'bears', 'holds', 'carries'], ['restriction'], ['sites'], ['for'], ['all'], ['the'], ['enzymes'], ['used'], ['in'], ['the'], ['digestion'], ['protocol'], ['.']]

Table 1 below provides the generated utterances with their ranking for case 1:

| Generated Utterances | Ranking |
|---|---|
| The ECD sample bears genomic DNA conflated with an 800- bp PCR product which holds restriction sites for all the enzymes used in the digestion protocol. | 0 |
| The ECD sample carries genomic DNA immixed with an 800- bp PCR production which contains restriction sites for all the enzymes used in the digestion protocol. | 0 |
| The ECD sample contains genomic DNA commingled with an 800- bp PCR production which bears restriction sites for all the enzymes used in the digestion protocol. | 1 |
| The ECD sample holds genomic DNA fused with an 800- bp PCR product which carries restriction sites for all the enzymes used in the digestion protocol. | 1 |
| The ECD sample carries genomic DNA commixed with an 800- bp PCR production which carries restriction sites for all the enzymes used in the digestion protocol. | 4 |
| The ECD sample contains genomic DNA mingled with an 800- bp PCR product which bears restriction sites for all the enzymes used in the digestion protocol. | 4 |
| The ECD sample holds genomic DNA merged with an 800- bp PCR production which contains restriction sites for all the enzymes used in the digestion protocol. | 5 |

| Generated Utterances | Ranking |
| --- | --- |
| The ECD sample bears genomic DNA melded with an 800- bp PCR product which holds restriction sites for all the enzymes used in the digestion protocol. | 5 |
| The ECD sample carries genomic DNA fluxed with an 800- bp PCR product which holds restriction sites for all the enzymes used in the digestion protocol. | 8 |
| The ECD sample bears genomic DNA combined with an 800- bp PCR production which contains restriction sites for all the enzymes used in the digestion protocol. | 8 |

Case 2: When a specific words/phrase such as ['PCR product'] is specified, then the tokenized version of above-mentioned text along with inflected synonym would be as shown below and possible utterance generated are 272.

[['The'], ['ECD'], ['sample'], ['contains', 'bears', 'holds', 'carries'], ['genomic'], ['DNA'], ['mixed', 'combined', 'commingled', 'amalgamated', 'commixed', 'blended', 'blent', 'conflated', 'immixed', 'coalesced', 'unified', 'mingled', 'fused', 'melded', 'mixt', 'merged', 'fluxed'], ['with'], ['an'], ['800-'], ['bp'], ['PCR product'], ['that'], ['contains', 'bears', 'holds', 'carries'], ['restriction'], ['sites'], ['for'], ['all'], ['the'], ['enzymes'], ['used'], ['in'], ['the'], ['digestion'], ['protocol'], ['.']]

Table 2 below provides the generated utterances with their ranking for case 2:

| Generated Utterances | Ranking |
| --- | --- |
| The ECD sample carries genomic DNA mingled with an 800- bp PCR product which carries restriction sites for all the enzymes used in the digestion protocol. | 0 |
| The ECD sample holds genomic DNA conflated with an 800- bp PCR product which contains restriction sites for all the enzymes used in the digestion protocol. | 0 |
| The ECD sample contains genomic DNA commingled with an 800- bp PCR product which bears restriction sites for all the enzymes used in the digestion protocol. | 0 |
| The ECD sample bears genomic DNA unified with an 800- bp PCR product which holds restriction sites for all the enzymes used in the digestion protocol. | 0 |
| The ECD sample contains genomic DNA coalesced with an 800- bp PCR product which bears restriction sites for all the enzymes used in the digestion protocol. | 2 |
| The ECD sample carries genomic DNA blent with an 800- bp PCR product which carries restriction sites for all the enzymes used in the digestion protocol. | 2 |
| The ECD sample holds genomic DNA immixed with an 800- bp PCR product which holds restriction sites for all the enzymes used in the digestion protocol. | 2 |
| The ECD sample bears genomic DNA mixt with an 800- bp PCR product which contains restriction sites for all the enzymes used in the digestion protocol. | 2 |
| The ECD sample carries genomic DNA combined with an 800- bp PCR product which contains restriction sites for all the enzymes used in the digestion protocol. | 4 |
| The ECD sample holds genomic DNA commixed with an 800- bp PCR product which carries restriction sites for all the enzymes used in the digestion protocol. | 4 |

It is observed from Table 2 that the phrase ['PCR product'] remains same in all the generated utterances.

Figure 4:
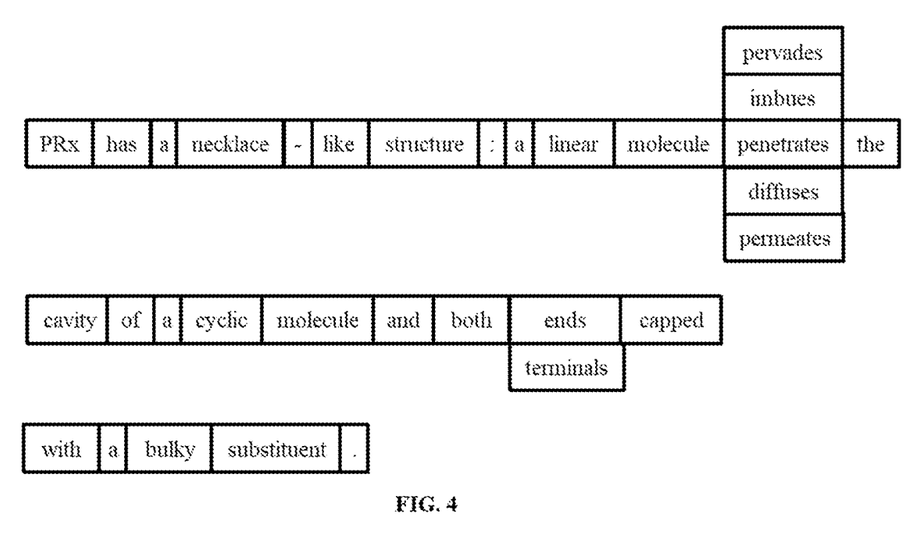
FIG. 4 is working example illustrating multi-utterance generation of data with immutability regulation and punctuation-memory according to some embodiments of the present disclosure.

FIG. 4, with reference to FIGS. 1-3, is the detailed model architecture for determining the optimal and cost-effective vaccine distribution chain network according to some embodiments of the present disclosure. An output for the input text data 'PRx has a necklace-like structure: a linear molecule penetrates the cavity of a cyclic molecule and both ends capped with a bulky substituent.' is shown in FIG. 4. It can be observed from FIG. 4 that inflected synonyms generated for the word 'penetrates' are 'pervades', 'imbues', 'diffuses' and 'permeates' and synonym generated for the word 'ends' is 'terminals'. Thus, the possible utterances generated for the above-mentioned inputs text are provided below as:

1. PRx has a necklace-like structure: a linear molecule penetrates the cavity of a cyclic molecule and both ends capped with a bulky substituent.
2. PRx has a necklace-like structure: a linear molecule pervades the cavity of a cyclic molecule and both ends capped with a bulky substituent.
3. PRx has a necklace-like structure: a linear molecule imbues the cavity of a cyclic molecule and both ends capped with a bulky substituent.
4. PRx has a necklace-like structure: a linear molecule diffuses the cavity of a cyclic molecule and both ends capped with a bulky substituent.
5. PRx has a necklace-like structure: a linear molecule permeates the cavity of a cyclic molecule and both ends capped with a bulky substituent.
6. PRx has a necklace-like structure: a linear molecule penetrates the cavity of a cyclic molecule and both terminals capped with a bulky substituent.

7. PRx has a necklace-like structure: a linear molecule pervades the cavity of a cyclic molecule and both terminals capped with a bulky substituent.
8. PRx has a necklace-like structure: a linear molecule imbues the cavity of a cyclic molecule and both terminals capped with a bulky substituent.
9. PRx has a necklace-like structure: a linear molecule diffuses the cavity of a cyclic molecule and both terminals capped with a bulky substituent.
10. PRx has a necklace-like structure: a linear molecule permeates the cavity of a cyclic molecule and both terminals capped with a bulky substituent.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

The present disclosure is more context aware to give accurate utterances required for training machine learning, deep learning models and other such applications without involving manual intervention and by maintaining quality of the generated utterances. For example, same word 'interest' would convey different ideas in finance context and entertainment context. Also, the system of the present disclosure is scalable to various input streams such as audio with help of converters/adapters.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, a plurality of input data pertaining to one or more applications, wherein the input data comprises text data and non-text data, and wherein the non-text data comprises one or more audios, one or more images, and one or more videos;
converting, via the one or more hardware processors, the non-text data into a text data based on one or more conversion techniques when the input data includes non-text data, results in forming converted text data;
combining, via the one or more hardware processors, the received text data and the converted text data to form combined text data;
processing, via the one or more hardware processors, the combined text data to obtain a processed text data with immutability regulation and punctuation memory enabled, and wherein processing of the combined text data comprising:
identifying a set of words from the combined text data;
tokenizing each of the combined text data such that the identified set of words are immutability regulated and punctuation consistency is maintained, wherein immutability regulated refers to a provision to selectively maintain or regulate phrases/words intact inferring a way of expressing a given text in varied ways considering relevance to domain, thereby minimizing efforts for manual creation of training data;
determining a plurality of context related synonyms in an inflected form for each of a plurality of tokenized text data; and
eliminating, one or more words identified as duplicates from the plurality of tokenized text data added with the plurality of context related synonyms in the inflected form;
iteratively generating, via the one or more processors, a plurality of multiple context-related utterances corresponding to each of the processed text data;
accumulating, via the one or more processors, the plurality of multiple context-related utterances that are ranked based on an index of deviation;
selecting, via the one or more processors, a set of high ranked multiple context-related utterances from the plurality of multiple context-related utterances when a number of possible multiple context-related utterance is greater than the number of required multiple context-related utterances and scalable to the non-text data with help of converters or adapters, wherein a first dictionary, an auto-updating dictionary utilizing a feedback, is dynamically updated when a coupling coefficient of n-grams of the plurality of text data exceeds a predefined threshold; and
training machine learning models with the set of high ranked multiple context-related utterances without manual intervention and by maintaining quality of the generated context-related utterances.

2. The processor implemented method of claim 1, wherein a subject domain corresponding to the plurality of input data is identified when required for the one or more applications based on at least one of (i) a user input, and (ii) using a statistical domain association based technique.

3. The processor implemented method of claim 1, wherein the identified set of words comprising a domain specific text determined from the first dictionary stored in a system database, an adaptable list of user specified text, and a set of marked strings of words, wherein the identified set of words is maintained across a plurality of instances of the multiple context-related utterances constructed.

4. The processor implemented method of claim 1, wherein the step of tokenizing each of the plurality of input data is preceded by performing an expansion of one or more contractions based text present in the text data.

5. The processor implemented method of claim 1, wherein the punctuation memory is enabled by creating a second dictionary comprising an information relevant to usage of a plurality of punctuations that are required when generating the multiple context-related utterances and the information relevant to usage of the plurality of punctuations includes preceding and succeeding token information.

6. A system, comprising:
a memory storing instructions;
one or more communication interfaces; and
one or more hardware processors coupled to the memory via the one or more communication interfaces, wherein the one or more hardware processors are configured by the instructions to:
receive, a plurality of input data pertaining to one or more applications, wherein the input data comprises text data and non-text data, and wherein the non-text data comprises one or more audios, one or more images, and one or more videos;
convert, the non-text data into a text data based on one or more conversion techniques when the input data includes non-text data results in forming converted text data;
combine the received text data and the Converted text data to form combined text data;
process, the combined text data to obtain a processed text data with immutability regulation and punctuation memory enabled, and wherein the processing of the combined text data comprising:
identifying a set of words from the combined text data;
tokenizing each of the combined text data such that the identified set of words are immutability regulated and punctuation consistency is maintained, wherein immutability regulated refers to a provision to selectively maintain or regulate phrases/words intact inferring a way of expressing a given text in varied ways considering relevance to domain, thereby minimizing efforts for manual creation of training data;
determining a plurality of context related synonyms in an inflected form for each of a plurality of tokenized text data; and
eliminating, one or more words identified as duplicates from the plurality of tokenized text data added with the plurality of context related synonyms in the inflected form;
iteratively generate, a plurality of multiple context-related utterances corresponding to each of the processed text data;
accumulate, the plurality of multiple context-related utterances that are ranked based on an index of deviation;
select, a set of high ranked multiple context-related utterances from the plurality of multiple context-related utterances when a number of possible multiple context-related utterance is greater than the number of required multiple context-related utterances and scalable to the non-text data with help of converters or adapters, wherein a first dictionary, an auto-updating dictionary utilizing a feedback, is dynamically updated when a coupling coefficient of n-grams of the plurality of text data exceeds a predefined threshold; and
train machine learning models with the set of high ranked multiple context-related utterances without manual intervention and by maintaining quality of the generated context-related utterances.

7. The system of claim 6, wherein a subject domain corresponding to the plurality of input data is identified when required for the one or more applications based on at least one of (i) a user input, and (ii) using a statistical domain association based technique.

8. The system of claim 6, wherein the identified set of words comprising a domain specific text determined from the first dictionary stored in a system database, an adaptable list of user specified text, and a set of marked strings of words, wherein the identified set of words is maintained across a plurality of instances of the multiple context-related utterances constructed.

9. The system of claim 6, wherein the step of tokenizing each of the plurality of input data is preceded by performing an expansion of one or more contractions based text present in the text data.

10. The system of claim 7, wherein the punctuation memory is enabled by creating a second dictionary comprising an information relevant to usage of a plurality of punctuations that are required when generating the multiple context-related utterances and the information relevant to usage of the plurality of punctuations includes preceding and succeeding token information.

11. One or more non-transitory computer readable mediums comprising one or more instructions which when executed by one or more hardware processors cause:
   receiving, a plurality of input data pertaining to one or more applications, wherein the input data comprises text data and non-text data, and wherein the non-text data comprises one or more audios, one or more images, and one or more videos;
   converting, the non-text data into a text data based on one or more conversion techniques when the input data includes non-text data, results in forming converted text data;
   combining the received text data and the converted text data to form combined text data;
   processing, the combined text data to obtain a processed text data with immutability regulation and punctuation memory enabled, and wherein the processing of the combined text data comprising:
      identifying a set of words from the combined text data;
      tokenizing each of the combined text data such that the identified set of words are immutability regulated and punctuation consistency is maintained, wherein immutability regulated refers to a provision to selectively maintain or regulate phrases/words intact inferring a way of expressing a given text in varied ways considering relevance to domain, thereby minimizing efforts for manual creation of training data;
      determining a plurality of context related synonyms in an inflected form for each of a plurality of tokenized text data; and
      eliminating, one or more words identified as duplicates from the plurality of tokenized text data added with the plurality of context related synonyms in the inflected form;
   iteratively generating, a plurality of multiple context-related utterances corresponding to each of the processed text data;
   accumulating, the plurality of multiple context-related utterances that are ranked based on an index of deviation;
   selecting, a set of high ranked multiple context-related utterances from the plurality of multiple context-related utterances when a number of possible multiple context-related utterance is greater than the number of required multiple context-related utterances and scalable to the non-text data with help of converters or adapters, wherein a first dictionary, an auto-updating dictionary utilizing a feedback, is dynamically updated when a coupling coefficient of n-grams of the plurality of text data exceeds a predefined threshold; and
   training machine learning models with the set of high ranked multiple context-related utterances without manual intervention and by maintaining quality of the generated context-related utterances.

* * * * *